United States Patent [19]

Smith et al.

[11] 4,197,769
[45] Apr. 15, 1980

[54] DUAL SPINDLE NC CHUCKING/TURNING MACHINE

[75] Inventors: Edward E. Smith, Wickliffe; Philip J. Stelmashuk, Euclid, both of Ohio

[73] Assignee: The Motch & Merryweather Machinery Company, Cleveland, Ohio

[21] Appl. No.: 902,933

[22] Filed: May 5, 1978

[51] Int. Cl.² .......................... B23B 3/32; B23B 9/12
[52] U.S. Cl. ............................................ 82/3; 82/2 D
[58] Field of Search ...................... 82/2 D, 3; 318/572

[56] References Cited

U.S. PATENT DOCUMENTS

| | | | |
|---|---|---|---|
| 905,680 | 12/1908 | Farrier | 82/2 D |
| 2,682,697 | 7/1954 | Daugherty et al. | 82/2 D |
| 3,365,989 | 1/1968 | Bullard et al. | 82/3 |
| 3,754,178 | 8/1973 | Dormehl et al. | 318/572 |

FOREIGN PATENT DOCUMENTS 1095496 12/1954 France ............................................ 82/3

*Primary Examiner*—Leonidas Vlachos
*Attorney, Agent, or Firm*—Maky, Renner, Otto & Boisselle

[57] ABSTRACT

A dual vertical spindle turning machine for simultaneously machining workpieces chucked on the respective spindles having a horizontally movable dual tool assembly including independent side-by-side tool slides, and independent drive motors for simultaneously moving the tool slides along a horizontal slideway of a vertically movable main slide. The tool slides have clearance therebetween to enable independent adjustment of either one or both of the tools by incremental energization of either one or both of the tool slide drive motors.

10 Claims, 2 Drawing Figures

DUAL SPINDLE NC CHUCKING/TURNING MACHINE

BACKGROUND OF THE INVENTION

In one known form of dual spindle NC chucking-/turning machine dual turrets with tool holders thereon are fixedly mounted on a tool slide for automatically performing identical machining operations on workpieces chucked on the respective spindles in response to NC control of the movements and positions of the main slide and tool slide on perpendicularly related axes parallel to the spindle axes (Z-axis) and transverse to the spindle axes (X-axis). However, in the event of uneven tool wear, temperature differences, and tool presetting errors the machined surfaces of the workpieces will vary and cannot be compensated for by the tool offset controls of the tool slide on the X-axis.

The foregoing problem of compensating for uneven tool wear, temperature differences, and tool presetting errors has been solved by providing a main tool slide on which a first turret is fixed and providing an auxiliary tool slide on the main tool slide for a second turret so that the latter may be adjusted by shifting the auxiliary tool slide independently of the main tool slide. When adjustment of the tool offset of the first turret is necessary, a summing circuit is provided which will cause the auxiliary tool slide on which the second turret is mounted to compensate for the main tool slide movement. Reference may be had to the U.S. Pat. No. 3,754,178 to Dormehl et al granted Aug. 21, 1973 for an apparatus including such summing circuit to compensate for tool wear in a multi-spindle machine tool in which a first tool is fixed on a motor-driven cross-slide and a second tool on an auxiliary tool slide is adjustable on the cross-slide by an auxiliary tool slide drive so that in the event of tool offset adjustment of the tool on the cross-slide, the summing circuitry operates the tool adjusting mechanism for the second tool to maintain a constant spacing between the working edges of the first and second tools.

SUMMARY OF THE INVENTION

In contradistinction to known dual spindle machine tools, the machine tool herein is characterized in that independent side-by-side tool slides have respective independent drive motors which are simultaneously actuated to perform identical machining operations on workpieces chucked on the respective spindles, both tool slides being slidable on the same slideway of a main slide and having clearance therebetween to enable independent adjustment of either one or both of said tools by incremental energization of either one or both of the drive motors.

The present invention is further characterized in that each tool slide has a turret on which different tool holders may be mounted for performing a plurality machining operations on the respective workpieces.

A further characterizing feature of the present invention is that one tool slide has a drive motor for indexing the turret carried thereby, the other tool slide having its turret coupled to said drive motor for simultaneous indexing of both turrets while permitting independent tool adjustment by incremental energization of either one or both of the tool slide drive motors.

Other objects and advantages will appear from the ensuing description.

DETAILED DESCRIPTION OF A PREFERRED EMBODIMENT

Figure 1:
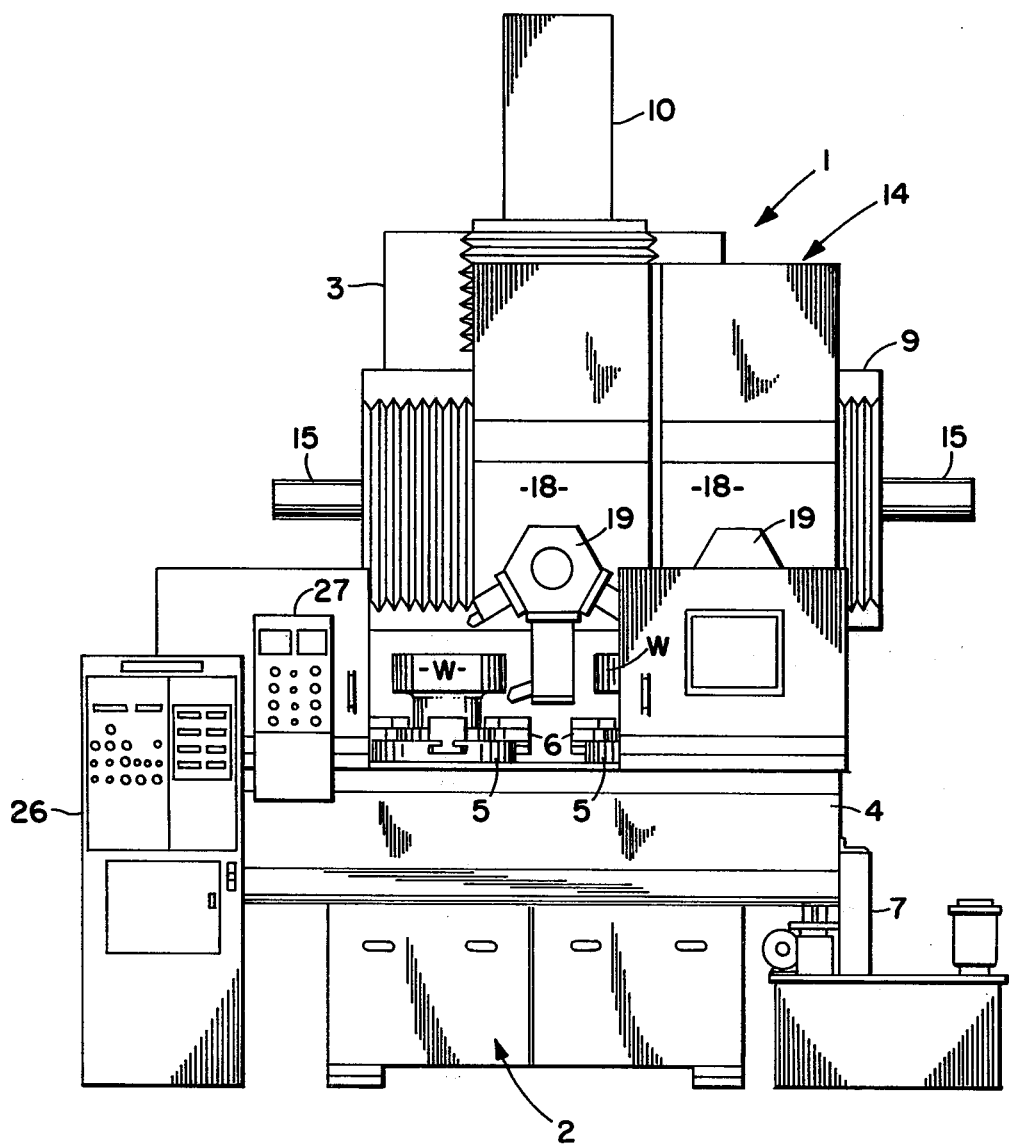
FIG. 1 is a front elevation view of a machine tool embodying the present invention.

The machine tool 1 herein comprises a frame structure 2 including a vertical column portion 3 and a forwardly projecting bed portion 4. The bed portion 4 has journalled therein dual vertical spindles 5 equipped with suitable chucks 6 for chucking of workpieces W thereon, said spindles 5 being driven at selected programmable speeds through bevel gearing (not shown) and SCR type regenerative drive means 7.

The column portion 3 has vertical slideways 8 on which the main slide 9 is vertically moved (Z-axis) as by a reversible drive motor 10 and a ball screw 11 engaging a ball nut (not shown) fixed in the main slide 9. The main slide 9 has horizontal slideways 12 therein on which a tool slide assembly 14 is moved horizontally (X-axis) along slideways 12 by reversible drive motors 15 having ball screws 16 engaging nuts 17 in side-by-side tool slides 18. As aforesaid, the tool slide assembly 14 comprises independent tool slides 18 in side-by-side relation and each guided on the same horizontal slideways 12 of the main slide 9.

Each tool slide 18 has an indexable turret 19 thereon on which different tool holders are mounted for performing turning, boring, or other operations on the associated workpiece W. Each tool slide 18 has a hydraulic cylinder 20 for actuating a wedge or the like (not shown) which unlocks the associated turret 19 for indexing and locks the same in selected indexed position.

One of the tool slides 18 has a rotary reversible hydraulic motor 21 which is operative to simultaneously index the turrets 19 through a worm drive 22 of coaxial shafts 23 which are axially slidably splined together by coupling 24. Suitable bevel and spur gearing on the respective shafts 23 and tool slides 18 transforms shaft 23 rotation to turret 19 indexing.

Each tool slide 18 also has a shot pin actuating hydraulic cylinder 25 to engage in one of the six equally spaced holes of the turret 19 to arrest the indexing movement thereof at the desired indexed position whereupon the turret locking cylinder 20 may be actuated to cause the wedge thereof to draw the associated turret 19 to locked indexed position with the Curvic coupling gear thereof engaged with the Curvic coupling gear affixed on the associated turret slide 18.

The machine tool 1 herein has operatively associated therewith an NC control which as well known in the art, may include a two-axis integrated circuit control unit 26 providing for plug-in functionally arranged circuit cards, a control arranged with linear and circular interpolation and photo-electric tape reader, an IPM (inches per minute) feed rate control, an "S" word spindle speed select control, a "T" word tool select control, a programmed dwell, a function and sequence number display, automatic zeroing, a multiplicity of pairs (e.g. 32) of tool offset ±0.999", an absolute dimension display, and numerous other well known features.

The control unit 26 has a keyboard as shown for the tool slides 18 for adjusting the cutting edges of either or both of the tools of each station of the turrets 19 in say ±0.0001″ increments by incremental energization of either one or both of the drive motors 15. In this way it is possible to easily and quickly maintain precision in the turned diameters or bored holes of the workpieces W to compensate for uneven tool wear or to compensate for errors due to thermal growth, or to compensate for errors in tool presetting. The workpieces W are thereby machined to close tolerances and by periodically measuring the various turned or bored diameters, the machining of the workpieces W may be closely controlled by operation of the appropriate keys of the keyboard to independently adjust the turret slides 18 as required. Instead of keys, dials may be provided on keyboard for dialing the increments of adjustment of each turret slide 18. The reference numeral 27 denotes the operator's push button station.

Figure 2:
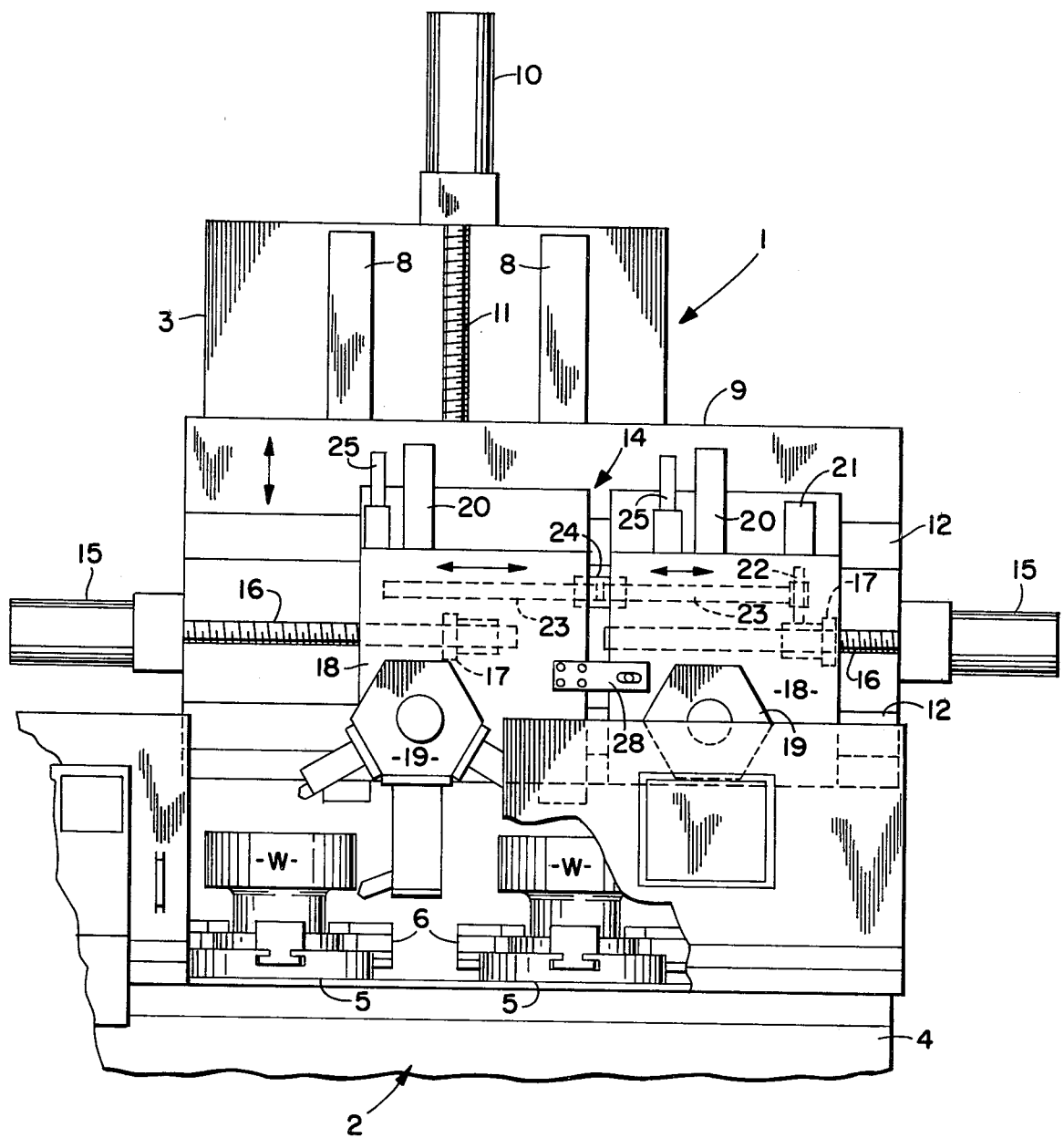
FIG. 2 is an enlarged fragmentary front elevation view with some parts removed to illustrate details of construction.

As shown in FIG. 2, the turret slides 18 have a pin and slot connection 28 to limit the extent (e.g. 1/16″) of independent adjustment movement thereof.

The main vertical slide 9 is preferably hydraulically counterbalanced and, of course, the hydraulic power source may be of familiar form including a tank and an electric motor driven pump and appropriate solenoid operated valves (not shown) controlled by the NC control unit 26 to actuate the hydraulic counterbalancing system, the hydraulic cylinders 20 and 25, the hydraulic turret indexing motor 21, and the hydraulic chucks 6.

The individual turret 19 offset capabilities eliminates the necessity of summing offset commands thereby eliminating the possibility of summation errors. Moreover, both turret slides 18 are mounted directly on the horizontal axis slideways 12 thus to result in greater rigidity, greater accuracy, and increased productivity.

We claim:

1. A dual spindle machine tool in which a main slide movable along a path parallel to the axes of rotation of said spindles toward and away from workpieces adapted to be mounted on the respective spindles has a transverse slideway which transversely movably carries a tool slide assembly including dual tools adapted to simultaneously perform a machining operation on such workpieces according to the movements and positions of said main slide and assembly; said machine tool being characterized in that said assembly comprises independent side-by-side tool slides each carrying one of said dual tools and each being movable along said transverse slideway on said main slide; and independent reversible power drive means on said main slide operatively connected to the respective tool slides to simultaneously move said tool slides in one direction or the other along said slideway upon energization of both of said drive means in one direction or the other; said tool slides having clearance therebetween to enable independent adjustment of either one or both of said tools by incremental energization of either one or both of said drive means in one direction or the other.

2. The machine tool of claim 1 wherein said drive means comprise motor driven screws on said main slide extending parallel to said slideway and engaged with nut means fixed to the respective tool slides; and wherein drive motors for said screws are secured to said main slide in coaxial relation to the respective screws and in straddling relation to said tool slide assembly.

3. A dual spindle machine tool in which a main slide movable along a path parallel to the axes of rotation of said spindles toward and away from workpieces adapted to be mounted on the respective spindles transversely movably carries a tool slide assembly including dual tools adapted to simultaneously perform a machining operation on such workpieces according to the movements and positions of said main slide and assembly; said machine tool being characterized in that said assembly comprises independent side-by-side tool slides each carrying one of said dual tools and each being movable along a transverse slideway on said main slide; and independent reversible drive means on said main slide operatively connected to the respective tool slides to simultaneously move said tool slides along said slideway; said tool slides having clearance therebetween to enable independent adjustment of either one or both of said tools by incremental energization of either one or both of said drive means in one direction or the other; each tool slide having an indexable turret adapted to carry a plurality of different tools; one of said tool slides having indexing means operatively connected to both turrets to simultaneously index said turrets to provide different dual tools for performing successive machining operations on such workpieces.

4. The machine tool of claim 3 wherein said indexing means includes a drive motor on said one tool slide operative to rotate co-axial shafts in said tool slides; said shafts being parallel to said slideway and being nonrotatably but axially movably coupled together to permit adjustments of either or both of said tool slides as aforesaid in any indexed position of said turrets.

5. A dual spindle machine tool in which a main slide movable along a path parallel to the axes of rotation of said spindles toward and away from workpieces adapted to be mounted on the respective spindles transversely movably carries a tool slide assembly including dual tools adapted to simultaneously perform a machining operation on such workpieces according to the movements and positions of said main slide and assembly; said machine tool being characterized in that said assembly comprises independent side-by-side tool slides each carrying one of said dual tools and each being movable along a transverse slideway on said main slide; and independent reversible drive means on said main slide operatively connected to the respective tool slides to simultaneously move said tool slides along said slideway; said tool slides having clearance therebetween to enable independent adjustment of either one or both of said tools by incremental energization of either one or both of said drive means in one direction or the other; said tool slides having a lost-motion connection with each other to limit the magnitude of such independent adjustment.

6. A dual spindle machine tool in which an L-shaped base has a horizontal bed portion rotatably supporting dual vertical spindles, and a vertical column portion having a vertical slideway on which a main slide is movable by drive means on said column toward and away from workpieces adapted to be mounted on the respective spindles, and in which said main slide has a horizontal slideway movably supporting a tool slide assembly including dual tools adapted to simultaneously perform a machining operation on such workpieces according to the movements and positions of said main slide and assembly on said slideways; said assembly being characterized in that it comprises side-by-side tool slides each carrying one of said dual tools and each being movable along said horizontal slideway; and independent reversible power drive means on said main slide operatively connected to the respective tool slides to simultaneously move said tool slides in one direction or the other along said horizontal slideway upon energization of both of said drive means in one direction or the other; said tool slides having clearance therebetween to enable independent adjustment of either one or both of said tools by incremental energization of either one or both of said drive means in one direction or the other.

7. The machine tool of claim 6 wherein said drive means comprise motor driven screws on said main slide extending parallel to said horizontal slideway and engaged with nut means fixed to the respective tool slides; and wherein drive motors for said screws are secured to said main slide in coaxial relation to the respective screws and in straddling relation to said tool slide assembly.

8. A dual spindle machine tool in which an L-shaped base has a horizontal bed portion rotatably supporting dual vertical spindles, and a vertical column portion having a vertical slideway on which a main slide is movable by drive means on said column toward and away from workpieces adapted to be mounted on the respective spindles, and in which said main slide has a horizontal slideway movably supporting a tool slide assembly including dual tools adapted to simultaneously perform a machining operation on such workpieces according to the movements and positions of said main slide and assembly on said slideways; said assembly being characterized in that it comprises side-by-side tool slides each carrying one of said dual tools and each being movable along said horizontal slideway; and independent reversible drive means on said main slide operatively connected to the respective tool slides to simultaneously move said tool slides along said horizontal slideway; said tool slides having clearance therebetween to enable independent adjustment of either one or both of said tools by incremental energization of either one or both of said drive means in one direction or the other; each tool slide having an indexable turret adapted to carry a plurality of different tools; one of said tool slides having indexing means operatively connected to both turrets to simultaneously index said turrets to provide different dual tools for performing successive machining operations on such workpieces.

9. The machine tool of claim 8 wherein said indexing means includes a drive motor on said one tool slide operative to rotate co-axial shafts in said tool slides; said shafts being parallel to said horizontal slideway and being non-rotatably but axially movably coupled together to permit adjustments of either or both of said tool slides as aforesaid in any indexed position of said turrets.

10. A dual spindle machine tool in which an L-shaped base has a horizontal bed portion rotatably supporting dual vertical spindles, and a vertical column portion having a vertical slideway on which a main slide is movable by drive means on said column toward and away from workpieces adapted to be mounted on the respective spindles, and in which said main slide has a horizontal slideway movably supporting a tool slide assembly including dual tools adapted to simultaneously perform a machining operation on such workpieces according to the movements and positions of said main slide and assembly on said slideways; said assembly being characterized in that it comprises side-by-side tool slides each carrying one of said dual tools and each being movable along said horizontal slideway; and independent reversible drive means on said main slide operatively connected to the respective tool slides to simultaneously move said tool slides along said horizontal slideway; said tool slides having clearance therebetween to enable independent adjustment of either one or both of said tools by incremental energization of either one or both of said drive means in one direction or the other; said tool slides having a lost-motion connection with each other to limit the magnitude of such independent adjustment.

* * * * *